United States Patent [19]

Ford, Jr. et al.

[11] Patent Number: 5,589,118
[45] Date of Patent: Dec. 31, 1996

[54] PROCESS FOR RECOVERING IRON FROM IRON-CONTAINING MATERIAL

[75] Inventors: George W. Ford, Jr., Salt Lake City; Richard C. Lambert, Lehi; Russell G. Madsen, Price, all of Utah

[73] Assignee: Covol Technologies, Inc., Lehi, Utah

[21] Appl. No.: 468,104

[22] Filed: Jun. 6, 1995

Related U.S. Application Data

[63] Continuation-in-part of Ser. No. 184,099, Jan. 21, 1994, Pat. No. 5,453,103.

[51] Int. Cl.$^6$ .............................. C22B 1/245; B29C 47/00
[52] U.S. Cl. ............ 264/122; 264/125; 264/128; 264/176.1; 264/319; 75/503; 75/767; 75/771; 75/772; 75/773; 428/546; 428/576
[58] Field of Search .................. 264/37, 109, 122, 264/125, 128, 176.1, 211.24, 236, 347, 319; 75/503, 746, 751, 767, 770, 771, 772, 773, 961; 428/407, 546, 576; 524/431, 785

[56] References Cited

U.S. PATENT DOCUMENTS

| | | | |
|---|---|---|---|
| 1,966,553 | 7/1934 | Kropp | 44/553 |
| 3,362,800 | 1/1968 | Belak et al. | 44/553 |
| 3,836,343 | 9/1974 | Romey et al. | 44/553 |
| 3,898,076 | 8/1975 | Ranke | 264/122 |
| 4,314,932 | 2/1982 | Wakimoto et al. | 524/785 |
| 4,415,337 | 11/1983 | Kutta et al. | 44/553 |
| 4,417,899 | 11/1983 | Morris et al. | 44/553 |
| 4,586,936 | 5/1986 | Schaffer et al. | 44/592 |
| 4,802,914 | 2/1989 | Rosen et al. | 75/772 |
| 4,863,485 | 9/1989 | Schaffer et al. | 44/553 |
| 5,147,452 | 9/1992 | Anderson et al. | 75/767 |
| 5,244,473 | 9/1993 | Sardessai et al. | 44/553 |

*Primary Examiner*—Robert A. Dawson
*Assistant Examiner*—Kenneth M. Jones
*Attorney, Agent, or Firm*—Foster & Foster

[57] ABSTRACT

Iron-rich-material waste products, such as electric arc furnace dust, are formed with an organic binder into discrete shapes, such as briquettes. The shapes can then be used in iron and steel making processes and the iron and heavy metal values in the waste product recovered.

13 Claims, 1 Drawing Sheet

PROCESS FOR RECOVERING IRON FROM IRON-CONTAINING MATERIAL

RELATED APPLICATIONS

This application is a continuation-in-part of U.S. patent application No. 08/184,099, filed Jan. 21, 1994 now U.S. Pat. No. 5,453,103, which issued Sep. 26, 1995.

FIELD OF THE INVENTION

The present invention involves the recovery of metal values from metallurgical waste materials, particularly those wastes formed in iron and steel making processes.

BACKGROUND OF THE INVENTION

In the production processes of iron and steel, waste materials are formed that contain oxidized iron and frequently other oxidized metals. These are usually materials in the form of dust in the gas waste streams. This waste is difficult to process because the dust usually has a fine particle size, and merely reintroducing it into a reduction furnace to recover the iron will usually result in it becoming again a part of the waste gas stream. Accordingly, these fine particle size materials, even though they contain a substantial metal content, are essentially worthless.

Them are methods of storing and stabilizing the dust into piles near the steel making facility, but this option is becoming increasingly unacceptable as environmental regulations become stricter and as land values increase. The dust can also be recycled and stabilized into ceramic or building materials. But these methods do not exploit the value of the residual iron and other metals in the waste.

A waste material of common concern is dust from electric arc furnaces, commonly referred to as EAF dust. Electric arc furnaces melt scrap metal through the use of high voltage electrical current. The scrap metal may come from a variety of sources, including; discarded railroad rail, cut sheet steel, discarded structural steel, and scrap automobiles. The scrap metal is added to the electric arc furnaces without separating non-ferrous metals, such as lead, zinc, and cadmium. During the operation of the electric arc furnace these non ferrous metals are vaporized from the scrap, condense into a dust from the waste gas stream and are deposited in the bag house. In addition to these metals, the waste gas stream deposits a large amount of recoverable iron in the bag house. Accordingly, the iron and heavy metal, usually in an oxidized form, are combined in an amorphous EAF dust with particle sizes commonly less than 20 microns. Such EAF dust is now classified as hazardous waste by the EPA due to the lead and cadmium content. As such, extensive procedures must be maintained in order to protect the environment from heavy metal contamination and meet EPA regulations. All the metals in the EAF dust have value and can be reclaimed if an efficient means of separation and reduction of the component dust can be achieved. Additionally, the EAF dust can be rendered non-toxic if the trace heavy metals can be removed from the dust.

Several process have been applied to this problem with differing degrees of success. While these processes have been successful in removing heavy metals, they have been inadequate in recovering the iron, and generally leave a fine iron oxide containing dust of no value.

The most common approach is called fuming. This process utilizes the differing boiling points of the heavy metals to obtain their separation. The dust is heated to temperatures above the boiling points of the metals being separated, causing the metals to evaporate. The evaporated metals are removed as a dust from the gas and condensed in a collection device for further processing. The boiling points of these trace metals are considerably lower than that of iron, which is the largest single component of the dust. After the lead, zinc, and cadmium are separated, the remaining dust consists primarily of iron in the form of iron oxide. Being in a dust form, this material cannot be successfully processed into iron and is left as a waste. Another problem with fuming, is that it is energy intensive, and it also produces a significant amount of its own waste dust.

Another process used to treat EAF dust is electrowinning. This process combines a leaching and precipitation operation with an electrolytic deposition. The EAF dust is first dissolved in an electrolyte to solubilize the lead, zinc, and cadmium. The solution is filtered and then precipitated with a zinc powder to capture the lead and cadmium. The resulting zinc solution is then passed through an electrochemical recovery cell to recover the zinc. This process recovers zinc quite well, but the leaching process does not dissolve the iron oxides and zinc ferrite, which remain as waste materials that must be dried. The dried material, once again, is in the form of a fine dust with little or no value.

EAF dust has also been processed by blending with silicate materials, such as silica sand, clay or cullet, and heated in a furnace to form a vitrified ceramic product. The ceramic is useful as an abrasive, and the EAF dust is rendered nonhazardous, but the valuable metals contained in the dust are not recovered. These metals have been through an expensive refining process just to be converted into a relatively low value material in order to render them nonhazardous.

OBJECTS OF THE INVENTION

It is, therefore, an object of the invention to provide a method for the treatment of dusts containing iron and heavy metals, that recovers both the iron and the heavy metals as a usable product.

Further objects of the invention will become evident in the description below.

SUMMARY OF THE INVENTION

In brief summary, the present invention overcomes or substantially alleviates the above-identified problems of the prior art. A method for forming a solid product, in the form of briquettes and/or pellets, is provided. The resulting product comprises an iron-rich material, e.g. EAF dust, and a carbon source, e.g., coke breeze and/or coal fines and/or revert materials, bound together into shapes, such as briquettes, to substantially prevent degradation into dust and smaller pieces. The briquettes provide a source of iron in steel and iron making processes and carbon for reduction of the iron. Furthermore, heavy metals in the iron-rich material are also incorporated into the briquettes and during the iron-reduction process are separated by being vaporized or fumed, thereby allowing these to be recovered. This fuming method is unique in that the feed material is first formed into a solid through the use of either briquetting or extruding a convenient shape utilizing an organic binder. The binder maintains the formed dust materials until the zinc, lead, and cadmium have evaporated, and the iron oxides have been reduced to elemental iron. This method allows all the materials contained in the EAF dust to be reclaimed in one process. The fuel for this process can be either waste coke breeze, waste coal fines, electric arc or natural gas, depending on which provides cost advantage.

Accordingly, the present process is for recovering iron and heavy metals from powdered iron-rich materials. These powders from which it has been previously not possible to recover the iron values, can now be manufactured into shapes that can be utilized in iron and steel manufacture. Not only is the iron recovered, but also any heavy metals are also recovered. Prior attempts to place carbon containing materials, such as coke breeze, coal fines, and/or revert materials in a solid form, such as briquettes, has been largely unsuccessful because the product does not adequately bind and is instable, disintegrating or retrogressively degrading back into small, fine particles during storage and handling prior to use. However, the present invention allows a carbon and iron containing material to be formed into a solid shape that is strong enough for handling and storage, as well as sufficient to bind the shapes in an iron-reduction process to inhibit early disintegration of the shape such that they are carried into the waste gasses as dust.

An embodiment of the invention is a process for manufacturing shapes from fine iron-rich material, the process comprising;

(a) mixing the iron-rich material, and a carbon source, to form a iron-rich/carbon mixture, the powdered material being essentially free of oils and moisture, (b) dissolving styrene or acrylonitrile polymer resin in a hygroscopic solvent to form a dissolved resin or conditioner;

(c) combining the dissolved resin, the iron-rich/carbon mixture, calcium carbonate, and an alumino-silicate binder, (d) emulsifying polyvinyl homomer in water, adding the emulsion to the combination of step (c) and substantially homogenizing the resultant; and (e) compressing the mixture from (d) into shapes.

By "fine iron-rich materials" is meant any powdered or small particle material containing iron, iron oxides or other iron compounds. The powdered material may also contain other metals, including heavy metals, in any form such as in metal oxides, as well as other minerals, particularly those found in ores, wast materials from mineral extraction, and the like.

A preferred iron-rich material is electric arc furnace dust (EAF dust) that is deposited from waste gas streams coming from electric arc furnaces used in iron and steel production.

The iron-rich material is essentially free of moisture, i.e., with a moisture level at or below 2 wt. %, and is essentially free of non-mineral substances, such as oils. This can be accomplished by any suitable cleaning and drying method, preferably, by the method that is more fully described and illustrated in the Example.

The powdered material is first mixed with a carbon source. At this point the iron-rich material and the carbon source material may be optionally reacted with a mineral acid, such a hydrochloric acid. The carbon source may be any suitable source, but is preferably a metallurgical grade coke. The carbon source should be fine enough and in a form that allows formation of the shapes, as discussed further below. In addition, it should not contain impurities that would interfere materially with formation of the shape or with the subsequent iron-reduction process in which the shape is used. The carbon source is preferably a fine powdered material.

In a typical application of the invention the powdered material and the carbon source are mixed to form a mixture of about between about 15 and 35 wt. %, preferably about 25 wt. % of the carbon source. The mixture is then reacted with hydrochloric acid. The mixture is preferably reacted with hydrochloric acid, in an amount between about 1 and 4 wt. %, preferably about 2 wt. % acid.

After reaction with hydrochloric acid, the iron-rich/carbon mixture is then compounded into a mixture with binders for forming into shapes. The reacted mixture is mixed with calcium carbonate, an alumino-silicate binder, an organic binder, and a polyvinyl alcohol. That is preferably accomplished by mixing the reacted mixture with calcium carbonate and an alumino-silicate material. The calcium carbonate acts as a hardener and also as a flux for removal of impurities in the reduction to iron. The alumino-silicate also functions as a hardener for the shapes, and also as a flux. The alumino-silicate material may be any of such materials used in forming shapes, such as kaolin clay materials, kaolinite, mixtures of alumina and silica, dolomite lime type clays, and the like.

Into the mixture with the calcium carbonate and alumino-silicate, an organic binder is mixed. The binder is the binder described in U.S. patent application No. 08/184,099, filed Jan. 21, 1994, now U.S. Pat. No. 5,453,103 which disclosure is hereby incorporated by reference. This binder is made by dissolving the styrene or acrylonitrile polymer resin in a hygroscopic solvent, such a methyl-ethyl-ketone.

To the mixture with the styrene polymer binder is added an emulsion made by emulsifying a polyvinyl polymer in water. The resultant is then substantially homogenized. The polyvinyl polymer may be polyvinyl alcohol or polyvinyl acetate.

The homogenized mixture with the polyvinyl acetate or polyvinyl alcohol is then formed into shapes by any suitable method, such as extrusion or molding. Preferably the extrusion or molding pressures are high, between about 15,000 and 45,000 psi, preferably about 30,000 psi, to produce dense, and fracture and abrasion resistant product.

DETAILED DESCRIPTION OF THE INVENTION

Example

Figure 1:
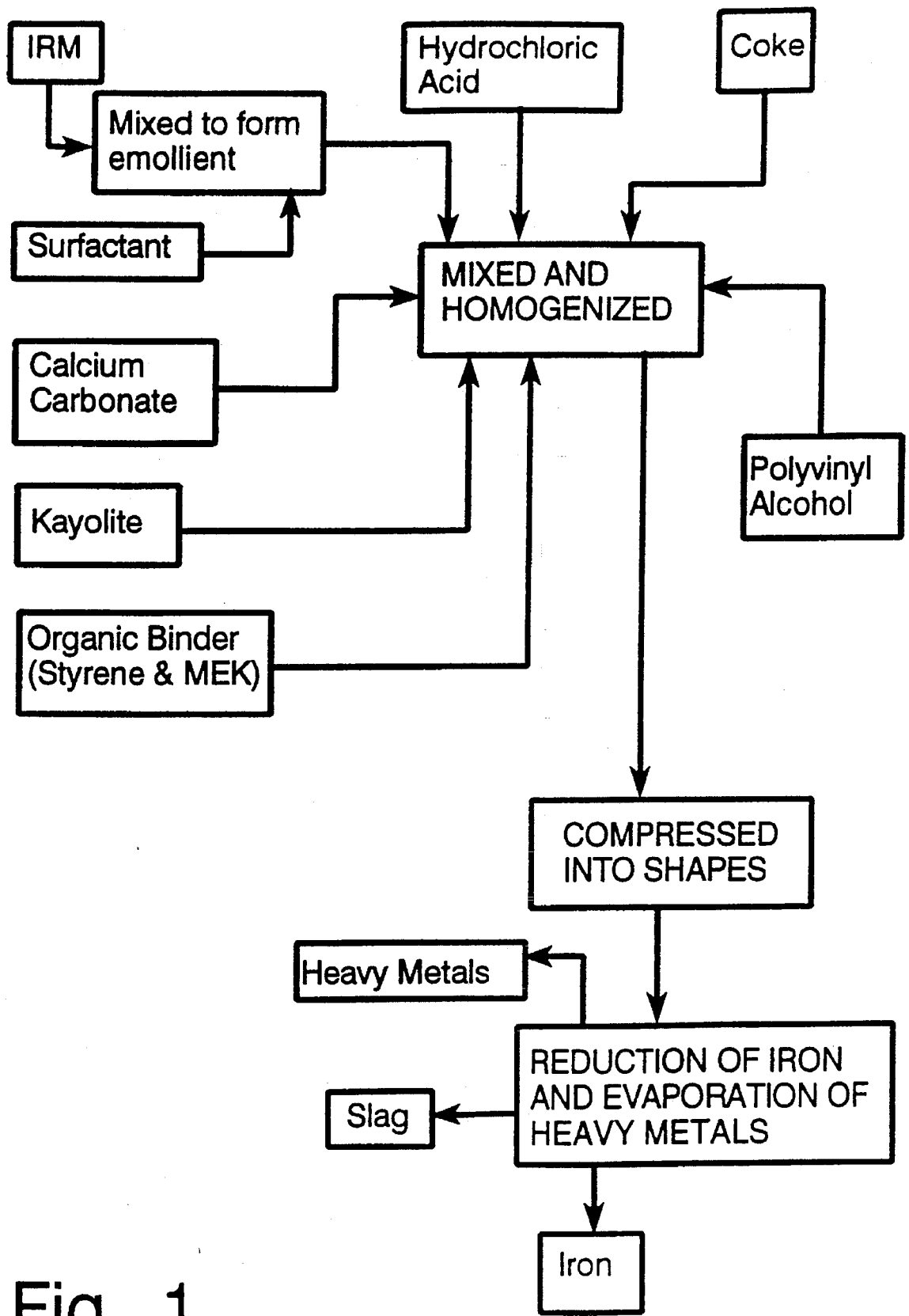
FIG. 1 is a flow sheet illustrating an embodiment of the invention.

This example illustrates the treatment of powdered iron-rich material (IRM) feedstocks and culminates in the production of high-grade iron metal. Referring to FIG. 1, IRM is first cleaned using a surfactant to create an emollient containing the oils and other contaminants found in the IRM. The IRM is dried in a rotary kiln to vaporize the emollient and reduce the total moisture content, preferably below about 2% weight, although up to 6% by weight may be used, depending upon the composition being processed.

The cleaned IRM is then weighted into a mixer along with approximately 25 wt. % metallurgical grade coke and reacted with hydrochloric acid at about 2 wt. %. The IRM, coke and hydrochloric acid is then mixed for about 5 minutes.

After mixing, about 5 wt. % calcium carbonate and 2.5 wt. % Kayolite ($Al_2O_3+SIO_2$) are added to the acid treated IRM and coke and mixed for about 5 minutes. The calcium carbonate and Kayolite act as hardeners in the IRM mixture and also as fluxes as the material is reduced to metal.

After mixing, about 3 wt. % of an organic binder material is added to the batch mixer and allowed to mix for approximately 5 minutes. The binder is a styrene polymer resin (10 wt. %) dissolved in a hygroscopic solvent, such a methyl-ethyl-ketone. As this binder contains a hygroscopic solvent, any water generated in the earlier reactions is driven off with the solvent.

After mixing, about 4 wt. % of a polyvinyl alcohol homomer is added to the mixture and allowed to mix for 10 minutes. The material is then fed into a briquetting press under high injection pressure to form an easily handled, hard shape.

The formed briquettes are then heated to about 250° to 400° F. to cure. The curing process reduces the moisture content of the briquette to less than about 2 wt. %. Once cured, the briquettes are introduced into an electric arc furnace where reduction of the oxides takes place. Reduction of iron oxides can take place with minimal power penalty due to the fact that the briquette is held together under the slag layer by the binder until such time as the reduction reaction can take place between the coke and oxidized iron. The other materials added to the briquette act as fluxes carrying impurities into the slag layer above the liquid metal bath.

Instead of the styrene polymer, an acrylonitrile polymer may be used. A suitable homomer material is 32-024 homomer PVA emulsion, available from National Starch and Adhesive. The acrylonitrile polymer is preferably retained in a prolonged fluid state by methyl ethyl ketone. Acrylonitrile polymer is available from Polymerland. Technical grade methyl ethyl ketone, available from Dice Chemical Co. and Thatcher Chemical Co., is preferred. Ninety percent (90%) by weight methyl ethyl ketone and ten percent (10%) by weight acrylonitrile polymer is suitable, although these amounts can be varied.

Theory

While it is not certain, perhaps the present invention polymerizes the carbon particles contained in the carbon source into a new long chain polymer compound, yet unidentified, which provides structurally superior strength of the shapes. It is known that oxides of carbon will hydrolyze in water. This reaction leaves free carboxyl ions present in the compound.

Introduction of the doped methyl ethyl ketone is believed to allow for attachment of the styrene polymer to the free carbon ions by exchange of the polymer for water which is absorbed into the solvent.

In the next phase, polyvinyl acetate is introduced. Again the presence of the methyl ethyl ketone acts as a catalyst to remove and allow the acrylonitrile or styrene to react to the polyvinyl acetate.

The resulting compressed shapes, such as briquettes and/or pellets, are structurally stable and do not retrogress into fine particles during storage and handling.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for manufacturing articles from fine iron-containing material, the process comprising;
   (a) mixing the iron-containing material, and carbon, to form an iron-containing/carbon mixture, the mixture being essentially free of oils and moisture;
   (b) dissolving styrene or acrylonitrile polymer in a hygroscopic solvent;
   (c) combining the dissolved styrene or acrylonitrile polymer, the iron-containing/carbon mixture, calcium carbonate, and an alumino-silicate binder;
   (d) emulsifying polyvinyl polymer in water, adding the emulsion to the combination of step (c) and substantially homogenizing the resultant; and
   (e) compressing the resultant from (d) into articles.

2. The process of claim 1 wherein the polyvinyl polymer is poly vinyl alcohol.

3. The process of claim 1 wherein the polyvinyl polymer is poly vinyl acetate.

4. The process of claim 1 wherein hydrochloric acid is added during the mixing of the iron-containing mixture and carbon in (a).

5. The process of claim 1 wherein the resultant in (e) is compressed into shape articles in a briquetting press.

6. The process of claim 1 wherein the resultant in (e) is compressed into articles through extrusion.

7. The process of claim 1 additionally comprising the step of heating the articles to remove moisture from the articles.

8. The process of claim 1 additionally comprising introducing the articles into a reaction environment for reduction of the iron in the articles.

9. The process of claim 1 wherein the iron-containing material contains heavy metals and the articles are introduced into a furnace for evaporation of the heavy metals and for reduction of the iron.

10. The process of claim 1 wherein the iron-containing material is treated before step (a) by mixing the iron-containing material with a surfactant to disengage non-mineral substances and form an emollient substance comprising surfactant and the non-minerals, and drying the emollient substance to reduce the moisture content thereof by vaporization.

11. A process according to claim 1 wherein the articles are compressed at a pressure of about 30,000 psi.

12. The process according to claim 1 wherein the hygroscopic solvent comprises methyl ethyl ketone.

13. A process for manufacturing shaped articles from fine iron-bearing material, the process comprising;
   (a) mixing the iron-bearing material, and carbon, to form an iron-bearing/carbon mixture, the mixture being essentially free of oils and moisture;
   (b) dissolving acrylonitrile polymer in a hygroscopic solvent;
   (c) combining the dissolved acrylonitrile resin, the iron-bearing/carbon mixture, calcium carbonate, and an alumino-silicate binder;
   (d) emulsifying polyvinyl polymer in water, adding the emulsion to the combination of step (c) and substantially homogenizing the resultant; and
   (e) compressing the resultant from (d) into shape articles.

\* \* \* \* \*